US012700283B2

(12) United States Patent
Qian et al.

(10) Patent No.: US 12,700,283 B2
(45) Date of Patent: Aug. 4, 2026

(54) GAME MONITORING DEVICE

(71) Applicant: Northernvue Corporation, Bellevue, WA (US)

(72) Inventors: Minglun Qian, Northbrook, IL (US); Lei Zhang, Bellevue, WA (US)

(73) Assignee: Northernvue Corporation, Bellevue, WA (US)

( * ) Notice: Subject to any disclaimer, the term of this patent is extended or adjusted under 35 U.S.C. 154(b) by 0 days.

(21) Appl. No.: 18/588,392

(22) Filed: Feb. 27, 2024

(65) Prior Publication Data

US 2024/0203205 A1 Jun. 20, 2024

Related U.S. Application Data

(62) Division of application No. 17/738,318, filed on May 6, 2022, now Pat. No. 11,948,425.

(51) Int. Cl.
*G07F 17/32* (2006.01)

(52) U.S. Cl.
CPC ...... *G07F 17/3241* (2013.01); *G07F 17/3211* (2013.01); *G07F 17/322* (2013.01); *G07F 17/3227* (2013.01); *G07F 17/3232* (2013.01)

(58) Field of Classification Search
CPC ............. G07F 17/3241; G07F 17/3211; G07F 17/322; G07F 17/3227; G07F 17/3232; G07F 17/3293
See application file for complete search history.

(56) References Cited

U.S. PATENT DOCUMENTS

| | | | |
|---|---|---|---|
| 4,531,187 | A | 7/1985 | Uhland |
| 4,965,443 | A | 10/1990 | Yamasaki |
| 5,707,287 | A | 1/1998 | McCrea, Jr. |
| 6,396,480 | B1 | 5/2002 | Schindler |
| 6,712,696 | B2 | 3/2004 | Soltys et al. |
| 7,901,285 | B2 | 3/2011 | Tran et al. |

(Continued)

FOREIGN PATENT DOCUMENTS

| | | | |
|---|---|---|---|
| AU | 2021-106867 | A4 | 12/2021 |
| CN | 106062836 | A | 10/2016 |

(Continued)

OTHER PUBLICATIONS

Booth; "Live Dealer Casino Studio and Technology in Europe"; Building Design & Construction Magazine; downloaded from the Internet on Mar. 11, 2022 at https://www.bdcmagazine.con1/2020/09/live-dealer-Casino-studio-and-technology-in-europe/; Sep. 18, 2020; 7 pages.

(Continued)

*Primary Examiner* — Kevin Y Kim
(74) *Attorney, Agent, or Firm* — Rimon PC

(57) ABSTRACT

A self-contained game monitoring device captures images of a game table and identifies objects relevant to the game and identifies values associated with objects. During the course of the game, the device can detect a violation of the players' bets according to pre-configured game rules. At the end of each game, the device can determine the outcome of the game (e.g., the win/lose/push on each bet) and can determine whether the dealer's action (e.g., payout on each bet) is consistent with the device's judgment. If an inconsistent action is detected, the device can notify the dealer/supervisor about a potential mistake.

20 Claims, 13 Drawing Sheets

(56) References Cited

U.S. PATENT DOCUMENTS

| | | | | |
|---|---|---|---|---|
| 7,905,784 | B2 | 3/2011 | Soltys et al. | |
| 8,016,665 | B2 | 9/2011 | Gururajan et al. | |
| 8,235,825 | B2 | 8/2012 | French | |
| 9,202,171 | B2 | 12/2015 | Kuhn | |
| 9,452,346 | B2 | 9/2016 | Grauzer et al. | |
| 11,948,425 | B2 | 4/2024 | Qian et al. | |
| 2002/0111205 | A1* | 8/2002 | Beavers | G07F 17/32 463/12 |
| 2003/0003988 | A1* | 1/2003 | Walker | G07F 17/323 463/21 |
| 2003/0064774 | A1 | 4/2003 | Fujimoto et al. | |
| 2005/0192099 | A1 | 9/2005 | Nguyen | |
| 2006/0128460 | A1* | 6/2006 | Muir | G07F 17/323 463/16 |
| 2007/0015583 | A1 | 1/2007 | Tran | |
| 2007/0276521 | A1* | 11/2007 | Harris | A63F 13/75 709/224 |
| 2008/0070652 | A1 | 3/2008 | Nguyen | |
| 2008/0113783 | A1 | 5/2008 | Czyzewski et al. | |
| 2009/0048026 | A1 | 2/2009 | French | |
| 2009/0124379 | A1 | 5/2009 | Wells | |
| 2010/0093429 | A1* | 4/2010 | Mattice | G07F 17/3232 463/25 |
| 2010/0311494 | A1 | 12/2010 | Miller | |
| 2013/0267319 | A1 | 10/2013 | Kuhn | |
| 2014/0121015 | A1 | 5/2014 | Massing et al. | |
| 2014/0295945 | A1* | 10/2014 | Nanni | G07F 17/3241 463/25 |
| 2015/0076765 | A1 | 3/2015 | Wadds et al. | |
| 2016/0358415 | A1* | 12/2016 | Kilby | G07F 17/3211 |
| 2017/0039807 | A1 | 2/2017 | Shigeta | |
| 2018/0075698 | A1 | 3/2018 | Shigeta | |
| 2018/0182208 | A1 | 6/2018 | Liu | |
| 2018/0276951 | A1 | 9/2018 | Litman | |
| 2019/0362594 | A1 | 11/2019 | Shigeta | |
| 2020/0151456 | A1 | 5/2020 | Leung et al. | |
| 2020/0175805 | A1 | 6/2020 | Nagata et al. | |
| 2020/0184765 | A1* | 6/2020 | Nguyen | G07F 17/34 |
| 2020/0242801 | A1 | 7/2020 | McClellan et al. | |
| 2020/0388109 | A1 | 12/2020 | Shigeta | |
| 2020/0402342 | A1* | 12/2020 | Kelly | G06N 3/08 |
| 2020/0402357 | A1 | 12/2020 | Moore | |
| 2021/0110648 | A1 | 4/2021 | Bucher | |
| 2021/0256800 | A1 | 8/2021 | Huang | |
| 2021/0272414 | A1 | 9/2021 | Shigeta | |
| 2021/0350654 | A1 | 11/2021 | Ikeda et al. | |
| 2022/0012981 | A1 | 1/2022 | Lyons et al. | |
| 2023/0360473 | A1 | 11/2023 | Qian et al. | |

FOREIGN PATENT DOCUMENTS

| | | | |
|---|---|---|---|
| CN | 106408785 | A | 2/2017 |
| CN | 107617212 | A | 1/2018 |
| CN | 110478888 | A | 11/2019 |
| CN | 110889344 | A | 3/2020 |
| CN | 113508392 | A | 10/2021 |
| KR | 10-2018-0123460 | | 10/2019 |

OTHER PUBLICATIONS

Circle Hough Transform; Wikipedia entry; downloaded from the Internet on May 5, 2022 at https://en.wikipedia.org/w/index.php?title=Circle_Hough_Transform&oldid=1056037781; Nov. 19, 2021; 4 pages.

Zheng, C. et al.; "Playing Card Recognition Using Rotational Invariant Template Matching"; *Proceedings of Image and Vision Computing New Zealand 2007*; Hamilton, New Zealand, Dec. 2007; pp. 276-281.

Zutis; "Who's Counting? Real-Time Blackjack Monitoring for Card Counting Detection"; Conference paper; DOI: 10.1007/978-3-642-04667-4_36; Research Gate; Oct. 2009; 11 Pages.

International Search Report mailed Jul. 21, 2023 for International Application No. PCT/US2023/020781.

Written Opinion mailed Jul. 21, 2023 for International Application No. PCT/US2023/020781.

Cover Letter dated Jan. 20, 2025 for Examination Report under Section 18(3) for Great Britain Patent Application No. GB2413863.8.

Examination Report under Section 18(3) dated Jan. 20, 2025 for Great Britain Patent Application No. GB2413863.8.

Dallmeier; "Smart Casino Solutions"; downloaded from the Internet on Jan. 16, 2025 at https://www.dallrneier.com/fileadmin/user_upload/PDFs/%20Industries/Casino/Dallmeier_Casino_Smar_Casino_Solutions.pdf ; Dallrneier International Ltd. Macau; Mar. 16, 2020; 4 pages.

Search Report completed Jun. 19, 2025 for Singapore Patent Application No. 11202406289W.

First Office Action dated Jul. 26, 2025 for Chinese Patent Application No. 202380032612.6, including English translation.

AU Examination Report No. 1, mailed on Nov. 18, 2024, in Australia Patent Application No. 2023265839.

AU Examination Report No. 2, mailed on May 12, 2025, in Australia Patent Application No. 2023265839.

Canada Requisition, mailed Feb. 7, 2025, in PCT Application No. US2023020781.

Canada Requisition, mailed Jul. 17, 2025, in PCT Application No. US2023020781.

Singapore Written Opinion, mailed Jun. 23, 2025, in Singapore Patent Application No. 11202406289W.

UK Cover Letter, mailed Nov. 18, 2024, for Great Britain Patent Application No. GB2413863.8.

UK Cover Letter, mailed Jun. 4, 2025, for Great Britain Patent Application No. GB2413863.8.

UK Examination Report, mailed Jun. 4, 2025, for Great Britain Patent Application No. GB2413863.8.

UK Examination Report, mailed Nov. 18, 2024, for Great Britain Patent Application No. GB2413863.8.

UK Intention to Grant, mailed Sep. 16, 2025, for Great Britain Patent Application No. GB2413863.8.

Anonymous; "Autofucus"; Wikipedia; Mar. 11, 2022; pp. 1-9. (Retrieved Mar. 27, 2026: https://en.wikipedia.org/w/index.php?title=Autofocus&oldid=1076421580).

* cited by examiner

GAME MONITORING DEVICE

CROSS-REFERENCE TO RELATED APPLICATION

This application is a divisional of U.S. patent application Ser. No. 17/738,318, filed May 6, 2022, which is hereby incorporated by reference.

BACKGROUND

Casinos often use a series of cameras to detect fraud or mistakes made by a dealer, but it is often a manual process that requires casino staff to monitor the video feeds of the cameras. Automated processes have been proposed. For example, U.S. Pat. No. 8,172,672 describes a system in which a series of cameras positioned around a gaming table sends images of playing cards on the gaming table to a remote server device located in a management room of the casino. The remote server device automatically judges the game win/lose result of the players and the dealer through image recognition of the images from the cameras. The remote server device also automatically judges the payouts to the players via wireless integrated circuit tags in the game chips. If the dividends are inconsistent with the expected result, the remote server device notifies the dealer and a casino hotel manager. As another example, U.S. Pat. No. 10,032,335 uses a series of cameras positioned around at a gaming table to capture images of the playing cards and chips on the table. Artificial intelligence is used to analyze the images to determine if fraud took place.

SUMMARY

The following embodiments generally relate to a game monitoring device. In one embodiment, a game monitoring device is provided comprising a display device; a memory configured to store rules of a game; at least one camera configured to capture images of a gaming table on which the game is played; and a processor. The processor is configured to: analyze images, captured by the at least one camera, of game objects and chips on the gaming table to determine an outcome of the game; and display, on the display device, a notification regarding the outcome of the game. The game monitoring device is a self-contained, stand-alone device in that the analyzing and displaying both occur in the game monitoring device without a need to communicate with a remote device during game play.

Other embodiments are possible, and each of the embodiments can be used alone or together in combination.

DETAILED DESCRIPTION

As discussed above, casinos often use a series of cameras to detect fraud or mistakes made by a dealer, but it is often a manual process that requires casino staff to monitor the video feeds of the cameras. While automated processes have been proposed, they are usually not adopted due to the cost, complexity, and incompatibility with a casino's existing infrastructure. For example, some systems may require network cabling to run between a remote server and the local cameras or other devices at a gaming table. For an established casino, this may require tearing down parts of the casino's ceiling, floors, or walls, if such remodeling is even possible. Also, such systems often require setting up several cameras around each gaming table and may require special floorplan layouts. Further, using special chips with integrated circuits adds cost and complexity. Additionally, some systems are used to detect mistakes or fraud at some later time and do not provide real-time monitoring of a dealer's chip redemption and collection or real-time detection of in-game betting violations.

The following embodiments can be used to address these issues. In one embodiment, a self-contained game monitoring device is used. In this embodiment, the game monitoring device is "self-contained" in that the camera(s), processing, and dealer and/or player notification system are all housed in a single device and in that the game monitoring device does not communication with a remote server or other device during game play to perform its game monitoring functions (although updates, game histories, and learning files, for example, can be communicated outside of game play through a wired or wireless connection).

Figure 1:
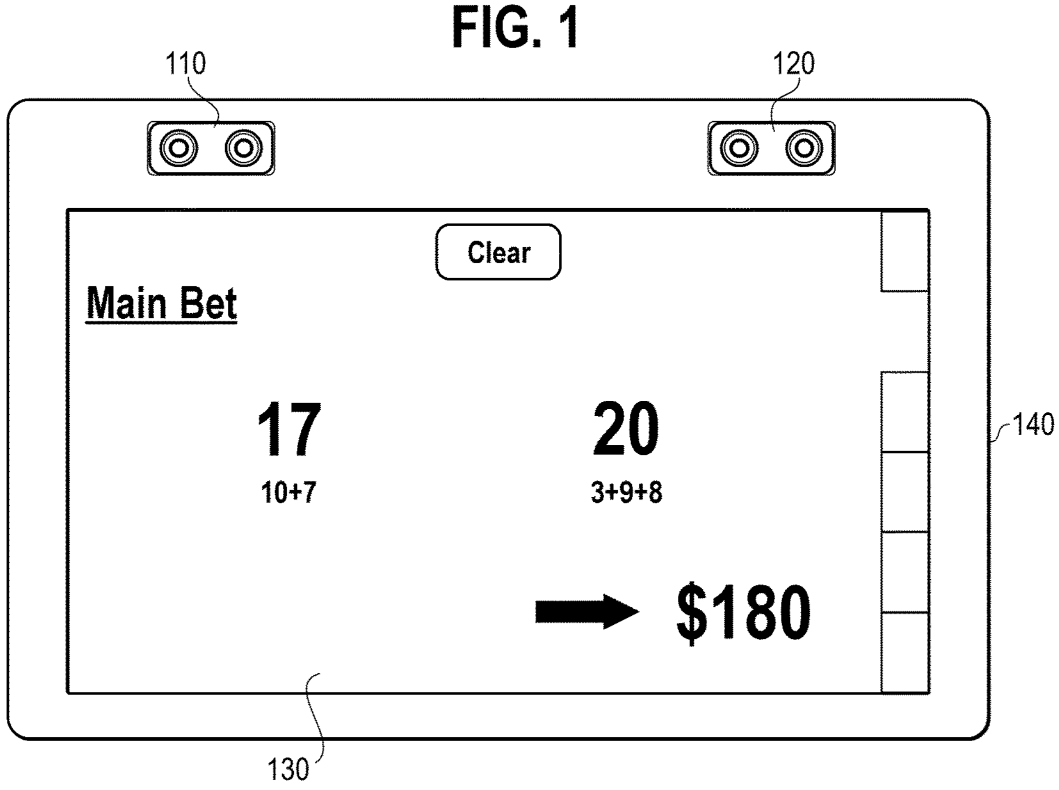
FIG. 1 is a diagram of a game monitoring device of an embodiment.

FIG. 1 shows an example game monitoring device 100 of this embodiment. It should be understood that this depiction is merely an example, and the details of this example should not be read into the claims unless expressly recited therein. For example, while the embodiments will be described below with respect to a card game, such as poker or blackjack, it should be understood that the game monitoring device 100 can be used to monitor other types of games and that the game monitoring device 100 can be configured with a game judgment algorithm suitable for other game rules. Also, the game monitoring device 100 can be used with non-card games where the game object is a spinning ball, a gaming wheel, dice, etc. instead of the game object being cards. Further, while these embodiments describe the game being played at a casino, it should be understood that the game monitoring device 100 can be used in any suitable gambling venue (e.g., a casino resort, cardroom, racino, riverboat casino, racetrack, bingo hall, or native American casino) or non-gambling venue (e.g., a home game, a charity event, etc.)

As shown in FIG. 1, the game monitoring device 100 of this embodiment comprises one or more cameras (here, first and second pairs of high-definition cameras 110, 120), a display/notification area/screen/device 130, and a housing 140. In one embodiment, the game monitoring device 100 takes the form of a tablet-like or smartphone-like device.

Figure 2:
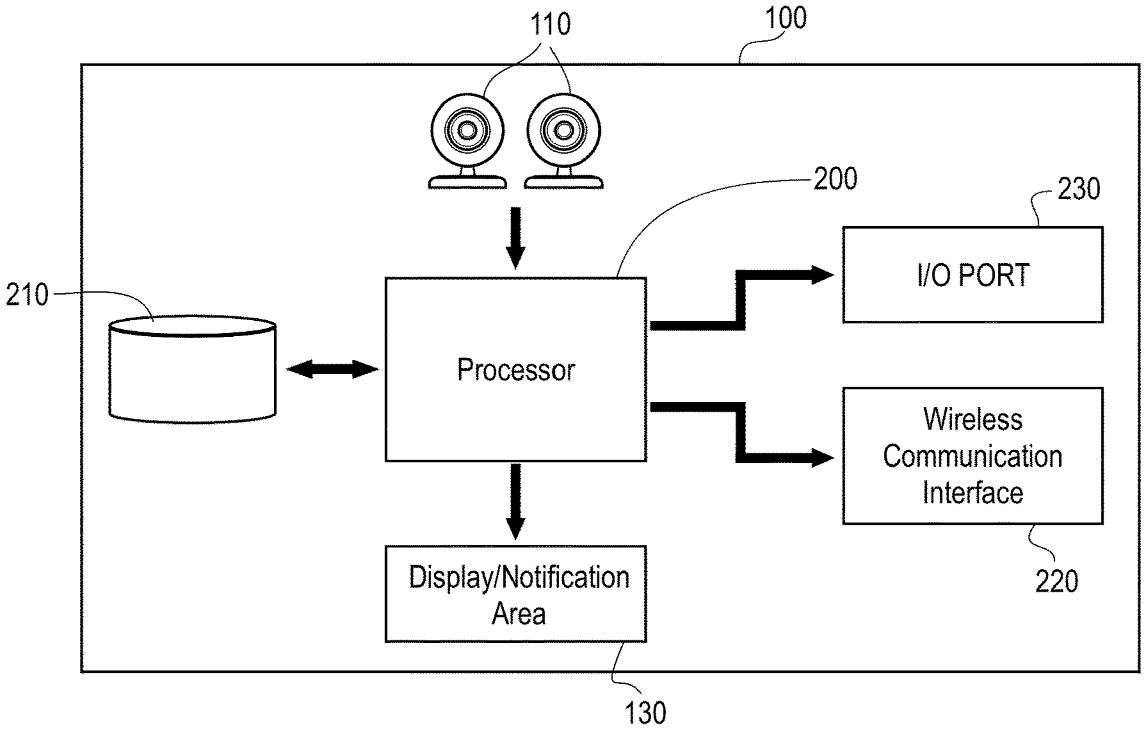
FIG. 2 is a block diagram of a game monitoring device of an embodiment.

FIG. 2 is a block diagram of the components of the game monitoring device 100 of this embodiment. As shown in FIG. 2, in this embodiment, the game monitoring device 100 contains at least one camera (only the first pair 110 of cameras is shown to simplify the drawing) and the display/notification area 130 mentioned above. The game monitoring device 100 also comprises a processor 200 and a memory (computer-readable medium) 210, which can store data, including, but not limited to, game rules, image data, video data, game play data, text data, as well as computer-readable program code executable by the processor 200 to implement the functions described herein.

The processor 200, which can be a micro-processor, can execute computer-readable program code (e.g., firmware) stored in the memory 210 (which can store other data) or in another computer-readable medium in the game monitoring device 100. The processor 200 can also take the form of a pure-hardware configuration using processing circuitry, logic gates, switches, an application-specific integrated circuit (ASIC), a field-programmable gate array (FPGA), or a programmable logic controller, for example. This configuration will also be referred to herein as a processor. Also, multiple processors may be used, such as when a central processing unit (CPU) is used with a graphics processing unit (GPU). So, the term "processor" can refer to one or more processors. The firmware and/or hardware of the processor 200 can be configured to perform the various functions described below and shown in the flow diagrams. The processor 200 can also be configured to control the camera(s), the display/notification area 130 (touch screen), and any other component(s) in the device 100. In one embodiment, the processor 200 takes the form of a Raspberry Pi. Of course, other implementations are possible.

The game monitoring device 100 also has a wireless communication interface 220 (e.g., a cellular and/or WiFi interface) and/or a physical input/output port 230 to accept a wired connection or a storage device (e.g., a USB drive). While connection to an outside device/server through these communication channels 220, 230 is not required during the monitoring of the game (because the device 100 is a stand-alone device), these communication channels 220, 230 can be used to provide the device 100 with game rules, configuration information, training information, software updates, etc. and also serves as a way for the device 100 to output stored historical data. The device 100 can contain other components.

The game monitoring device 100 of this embodiment is a self-contained, standalone device that analyzes images taken by the device's camera(s) of the gaming table and displays a notification concerning the outcome of the game, all without a need to communicate with a remote device during game play (as mentioned above, communication with a remote device can occur outside of game play to, for example, receive various updates). Being self-contained avoids the problems mentioned above with respect to networked systems that rely upon a plurality of cameras located around a gaming table to communicate with a remote server device. However, being self-contained also provides some challenges. For example, because all the camera(s) are located in the device 100 itself, positioning in the device 100 so that it sees the entire relevant field of view of the table 20 can be important. To assist in this, in one embodiment, the processor 200 is configured to provide auto-focusing of the camera(s) (e.g., using artificial intelligence). Also, to make sure there are a sufficient number of good images on which to base an analysis, the processor 200 can cause the camera(s) to capture images at a selected high frequency (e.g., throughout game play). That way, if a card or chip is not clearly recognizable in one image, it may be recognizable in one of the many other images that are captured. However, because the memory 210 of the device 100 may be limited and because all of the captured images are stored internal to the device 100 by virtue of it being self-contained, it is possible for the memory 210 to run out of space. To address this, the processor 200 can use an intelligent storage algorithm, in which the retention time of any given image is based on its use. Also, because a casino may use multiple devices 100, one for each of its many gaming tables, a centralized batch training and configuration tool can be used to customize each device 100. This will be discussed in more detail below.

Figure 3:
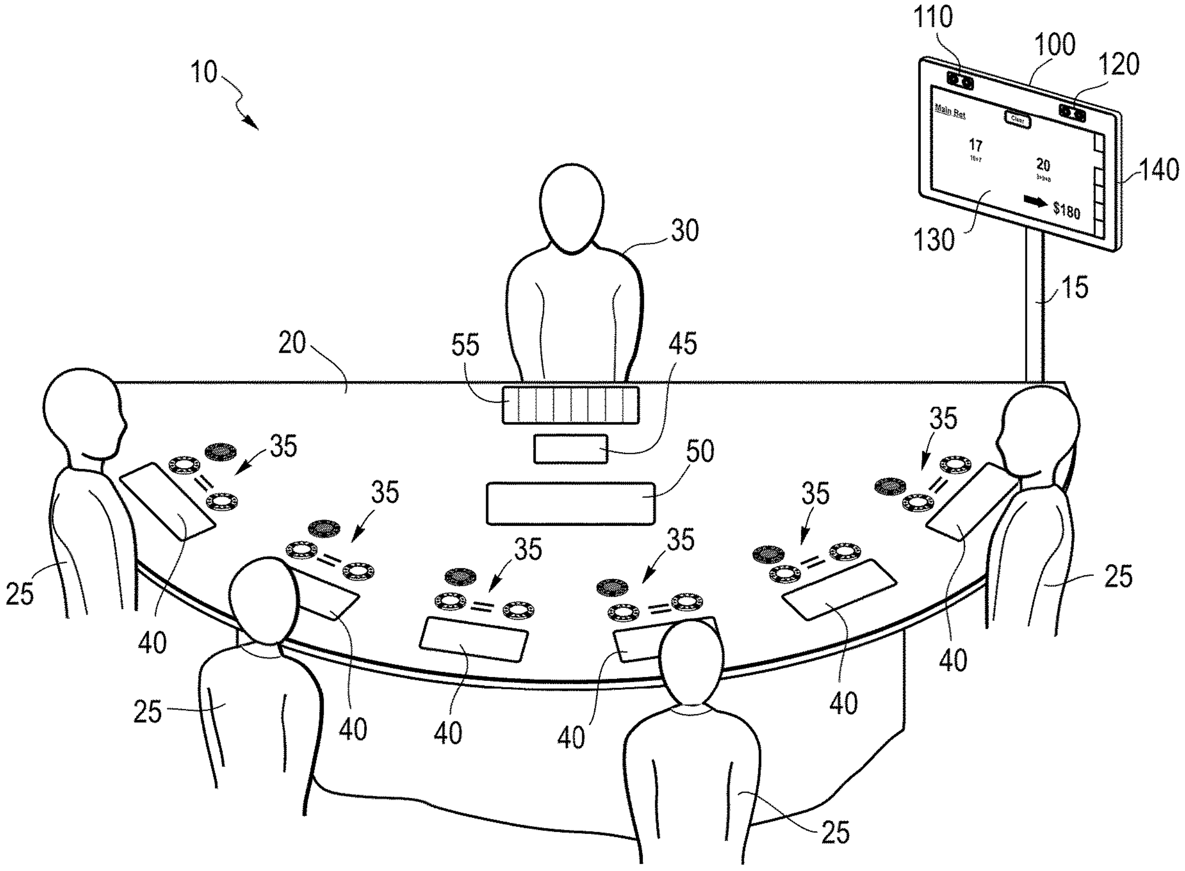
FIG. 3 is a diagram of an example gaming environment of an embodiment.
Figure 4:
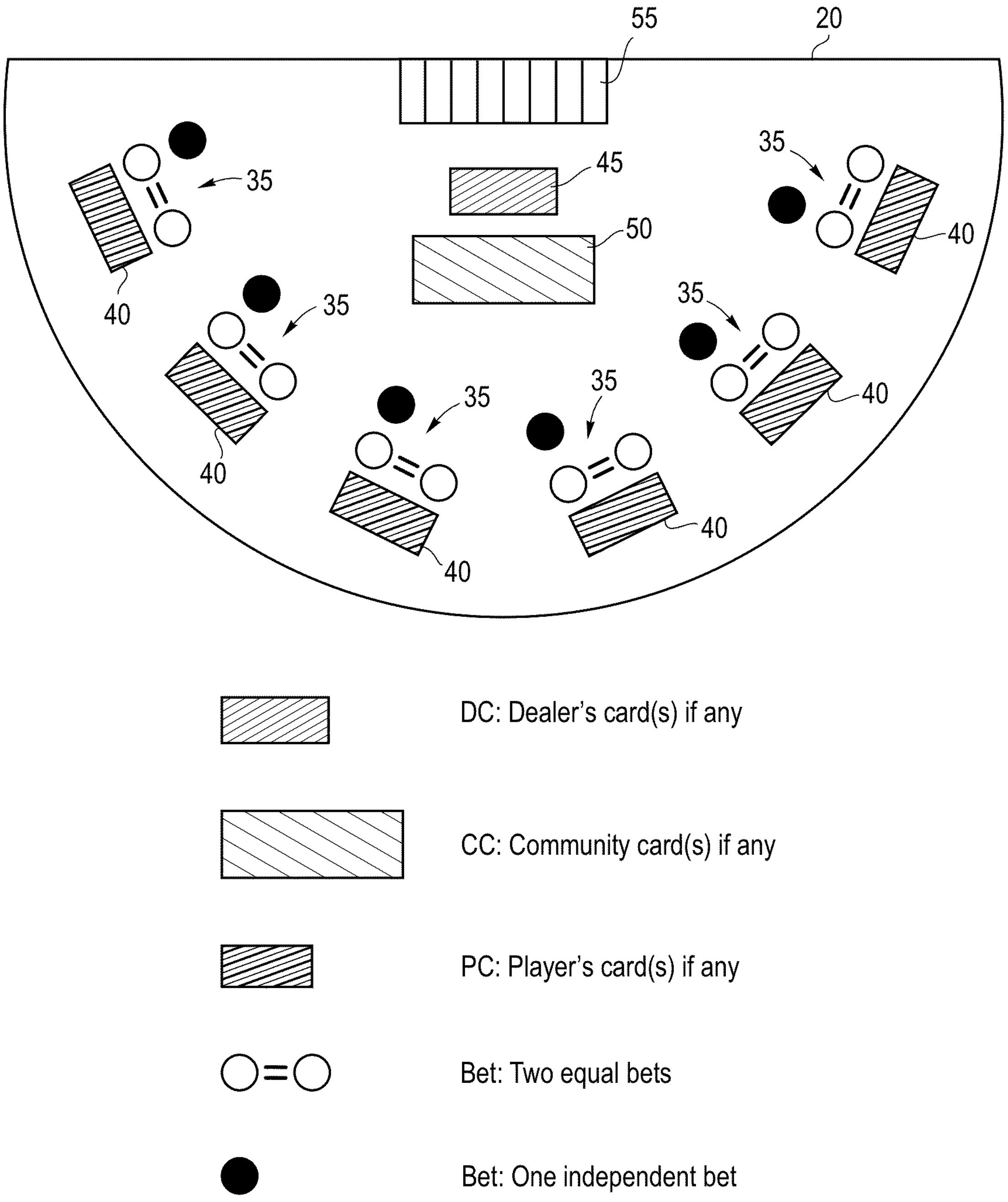
FIG. 4 is a diagram of a gaming table of an embodiment.

Turning again to the drawings, FIG. 3 shows an example gaming environment 10. As shown in FIG. 3, in this example, the game monitoring device 100 is positioned on a pole 15 on or near the gaming table 20, around which are a number of players 25 (only some are shown to simply the drawing) and a dealer 30. As shown in more detail in FIG. 4, on the table 20 are various chips 35 representing bets by the players 25, the player's cards 40, the dealer's cards 45, community cards 50, and the dealer's chip set 55. Of course, the types and number of cards, as well as chips, can vary based on the game being played.

Figure 5:
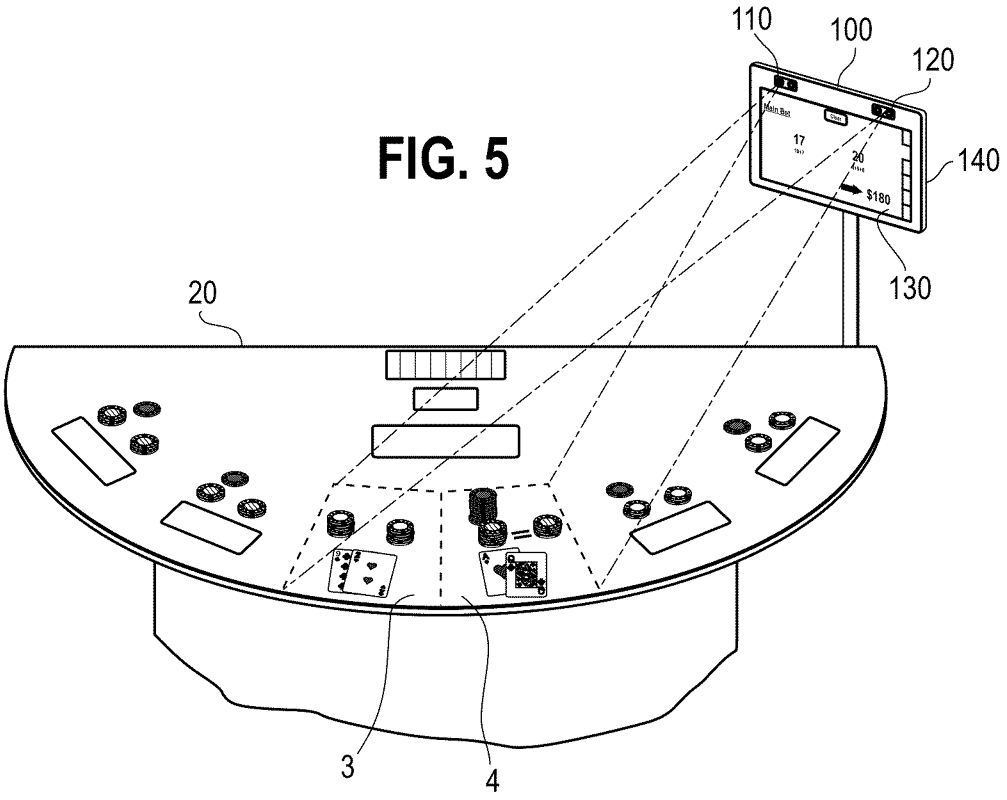
FIG. 5 is an illustration of a game monitoring device of an embodiment monitoring two player positions on a gaming table.
Figure 6:
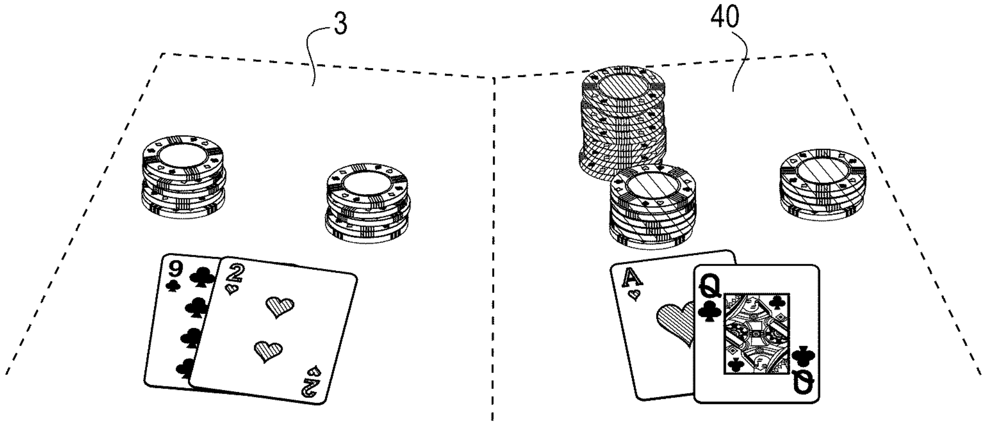
FIG. 6 is an expanded view of the two player positions in FIG. 5.

As illustrated in FIGS. 5 and 6, the game monitoring device 100 is positioned such that the camera(s) in the game monitoring device 100 can see the cards and chips on the table 20, as well as so the dealer and/or players can see the display/notification area 130 (more on that below). In this example, the first pair of cameras 110 is focused on the cards and chips of the third player's position (position 3) on the table 20, whereas the second pair of cameras 120 is focused on the cards and chips of the fourth player's position (position 4) on the table 20.

In general, the processor 200 of the game monitoring device 100 uses the images of the cards and chips captured by the camera(s), in conjunction with its knowledge of the rules of the game, to determine the outcome of the game and monitor the payouts at the end of the game, possibly even assisting with the payouts via the display area 130. More specifically, the display area 130 can serve one or more purposes. One purpose can be to notify dealers and/or supervisors in real-time about a potential dealer error on payout of a bet or the player's violation on a particular bet during the game. For example, when a dealer makes a mistake (e.g., an incorrect amount is paid to player), the device 100 can provide a visual alert (e.g., a dashboard warning light on the display area 130) and/or an auditory alert (via a speaker (not shown) in the device 100) to attract immediate attention from the dealer and/or floor supervisor. The device 100 can display a "clear" button to dismiss visual and auditory alerts, and the floor supervisor can press the "clear button" to reset the device 100 after the dealer error is rectified or to clear up alerts in case it was caused by an unexpected issue from the device 100 itself. The display area 130 can also offer outcome suggestions in real-time for each play (e.g., the win/lose outcome of the game and its monetary value of winnings or losses can be displayed once the game is finished), which can be used for both players and dealers. Further, the display area 130 can be used to display the dealer chip count in real time. The device 100 can be configurable (e.g. by a supervisor) to only have some of these features enabled.

Using the images of the cards and chips captured by the camera(s) of the game monitoring device 100, the processor 200 can use edge computing, artificial Intelligence, and/or machine learning to monitor the game for dealer errors in game judgment and wage payouts and/or assist the dealer in avoiding such errors, which can be due to stress, inattention, or being tired. The processor 200 can generate real-time suggestions and notifications to the dealer/supervisor and display them on the display area 130 of the device 100. The processor 200 can also provide real-time monitoring on game rule violations by human participants in the game, such as a violation on the minimum/maximum wage allowed on each bet, and check if a subsequent bet complies with the game rules. The processor 200 can also provide analytics, such as game statistics and dealer performance statistics, which may be highly valuable to casino management.

Specifically, for example, in a casino table game, a dealer makes a judgment on who wins the game (against the dealer or against the other players) and delivers a payout to the player or sweeps the player's bet. Human mistakes can happen in the judgment of who won the hand and in the payout to the winner. The error rate is elevated when the dealer is a new hire or not familiar with the game or when the dealer is tired. It is also possible that a dealer is not good at calculating a payout in a complicated game with multiple bets. Those errors are usually against the casino, as errors not in favor of players are likely caught by the players and corrected. Also, an error should be corrected promptly before the player leaves the game. So, a monitoring process is very valuable in identifying/correcting human mistakes on the spot and evaluating performance of different dealers for a specific game, so that management can assign appropriate dealers to the games. On the other hand, casinos may not want to make extensive changes to accommodate the monitoring process. Accordingly, this standalone, independent monitoring device 100 can be highly desirable, as it provides the casino with the capability of automatic monitoring/correcting/verifying table games with no infrastructure changes needed. That is, the game monitoring device 100 of these embodiments is a stand-alone device that needs, at most, only minimal integration with the existing infrastructure of a casino. The device 100 is highly portable, easily installed, easily configured, and easily updated with new game rules. These features afford the casino operator with little interruption for initial installation and subsequent upgrade and makes the device 100 independent of other existing systems adopted by a casino.

The game monitoring device 100 can have additional functionality as well. For example, the processor 200 can also implement a data tracking and analysis module that provides historical data for table performance and/or dealer performance analysis if the casino chooses to retain data for the more analytics. Historical data can be accessed, for example, from the device 100 via a local area network (LAN) computer or a cloud server per permission granted by casino management. More specifically, the data tracking and analysis module can store data in the memory 210 from historical plays for a certain period of time, including timestamps, player and dealer's cards, betting and win/loss amounts, as well as their corresponding settlement images. The historical chip counts in the dealer's chip trays can also be recorded. The casino management can turn on this feature to sync/export the captured data into their information technology (IT) systems (or provide application programming interface (API) access to the data) for further analysis.

When a human error is detected, an additional field can be added to the dataset to indicate that. By analyzing the data log, the return on investment and effectiveness of the device 100 can be closely monitored. Management at the casino can assess the profitability of the game or side bets, the performance of different dealers for the game, fraud detection, and error rate for the game. Upon request from the casino, the device 100 can be configured to connect to cloud servers for more data labeling (e.g., image annotation) and the supervised learning and training of neural networks. This helps improve the machine-learning algorithms and also can be used to provide automated software upgrades for the device 100.

Figure 15:
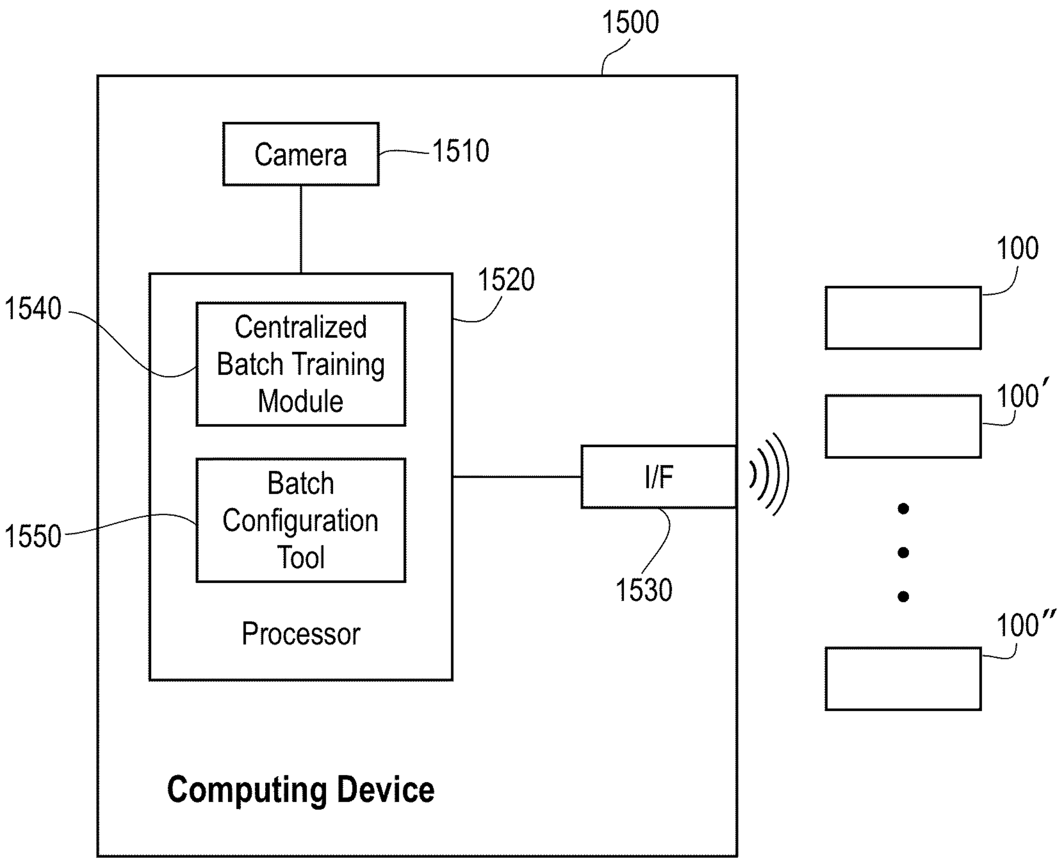
FIG. 15 is a block diagram illustrating a configuration process of an embodiment.

In another embodiment (see FIG. 15), a mobile app or software application executed on a processor 1520 of a computing device 1500 (e.g., a computer, tablet, smartphone, etc.) separate from (but perhaps part of the same local area network as) the device(s) 100-100" can have centralized batch training and configuration modules 1540, 1550 that use a camera 1510 (integrated with or separate from the computing device 1500) to take images of casino gaming objects and chips as a training exercise to configure the parameters/settings of one or many devices 100-100". This way, all the devices 100-100" in a casino can be initialized in a batch based on casino-specific game rules. For example, casinos may need multiple devices 100-100", and different casinos may also have some varieties in their game rules. Each casino can use online registration to gain access to the software application and/or mobile app. After verification, the casino can log into their account and define their own configurations/settings for each game. The centralized batch training module 1540 can require a system administrator to present all casino chips (including special designs) and faces of a deck of poker cards to be captured by the camera 1510. Each chip may need multiple snapshots from different angles and from multiple distances on the gaming table. A similar process can be performed on poker cards. Once this training is complete, the computing device 1500 can generate a training result file that can be either broadcasted to all standalone devices 100-100" or copied to a specific device via the data port 230 (e.g., using a USB drive). In addition, each device 100-100" can have its own user interface (UI) to adjust certain table-specific settings (e.g., the maximum and minimum betting amount). The casino supervisor can make local changes, if necessary.

The following paragraphs provide example implementations of the game monitoring device 100 of these embodiments. It should be understood that these are merely examples, and the details presented herein should not be read into the claims unless expressly recited therein.

In one example implementation, the camera(s) 110, 120 of the game monitoring device 100 take snapshots covering the entire game table 20, and the processor 200 provides artificial-intelligence-powered autofocusing to automatically zoom in and out to get high-resolution images on the areas of interest of the table 20. In one embodiment, the processor 200 is configured with a computer-vision software module with embedded image analytics. The computer-vision software module can be used to perform automatic image recognition on captured continuous representations of images to identify all relevant gaming objects (e.g., cards, chips, and dices) along with the values of interested objects (e.g., suit and rank of a card) on the game table 20 using a machine-learning algorithm and/or a deterministic algorithm, for example. The computer vision software module can be called by multiple steps in the processor's game judgment algorithm when the value of cards, chips, or dice need to be checked.

More specifically, in one embodiment, the processor's computer vision software module performs automatic image recognition by performing a two-step process. First, the processor 200 identifies objects of interest on the gaming table 20 using one or both of the following approaches. In one approach, the processor 200 detects specific geometric shapes (e.g., the shape of a card, the shape of a chip pile, etc.) in a captured image using an edge detector to identify objects of interest and associates those objects with either a seat position, the dealer, or the community. The processor 200 can analyze the image captured by the device's camera(s) to identify individual betting areas for card(s) for each player, an area for card(s) for the dealer, and area for community card(s). The number and the location of betting spots for players may vary in different games. An image of the table layout can be stored with correct areas labeled.

In the second approach, the processor 200 identifies objects of interest for each area identified (e.g., cards, chips, dice, etc.). For example, objects of interest can be cards in dealer's cards/community cards and in player's cards areas and chips in betting areas. Objects can be associated with players or the dealer corrected in order for the processor's game judgment algorithm to work correctly.

The processor 200 then causes the camera(s) to take a picture of the empty gaming table 20 at the initial calibration time and uses that image as a benchmark image. The embedded AI-based image process can automatically identify betting areas for each designated seat within the benchmark image. When a new image of the table top is taken, the embedded software in the processor 200 can rotate and rescale the new image to match the table edge with the table edge in the benchmark image. Given that the game table is static during the course of the game, the processor 200 can use the difference between the newly-captured image of the table top 20 and the benchmark image to identify objects of interest. Coupled with the boundaries of betting areas for each seat position, the embedded software in the processor 200 can then associate identified objects with individual players. As shown in FIG. 6, cards and chips are identified and associated with two active players. The processor 200 can also use the difference between two consecutive images to identify the real-time change of objects on the table. The above processes can be combined to verify each other's output to further improve the accuracy of object identification.

Next, the software model in the processor 200 can identify the value(s) of objects of interest using image recognition. The values for a playing card can include the value and suit, the value for a casino chip can be the face value chip in local currency nominal value, and the value for a dice can be the dice number shown. The processor 200 can use computer-vision image recognition to recognize the card and the chip. In card recognition, the processor 200 recognizes both the suit and rank. The recognition technique can be based on, for example, the matching technique described in "Playing Card Recognition Using Rotational Invariant Template Matching" published by Zheng and Green from University of Canterbury, Christchurch, New Zealand in December 2007. The embedded software can come with a variety of templates on suits and ranks, but if the cards used are very different from regular poker cards, the processor 200 can have the option of card learning on each poker card during the initial activation process in order to generate a new set of templates specific for that casino. The corner of the card can be extracted to perform both rank match and suit match. The color of the suit can also be used to verify suit recognition, especially between a spade and a heart.

Figure 7:
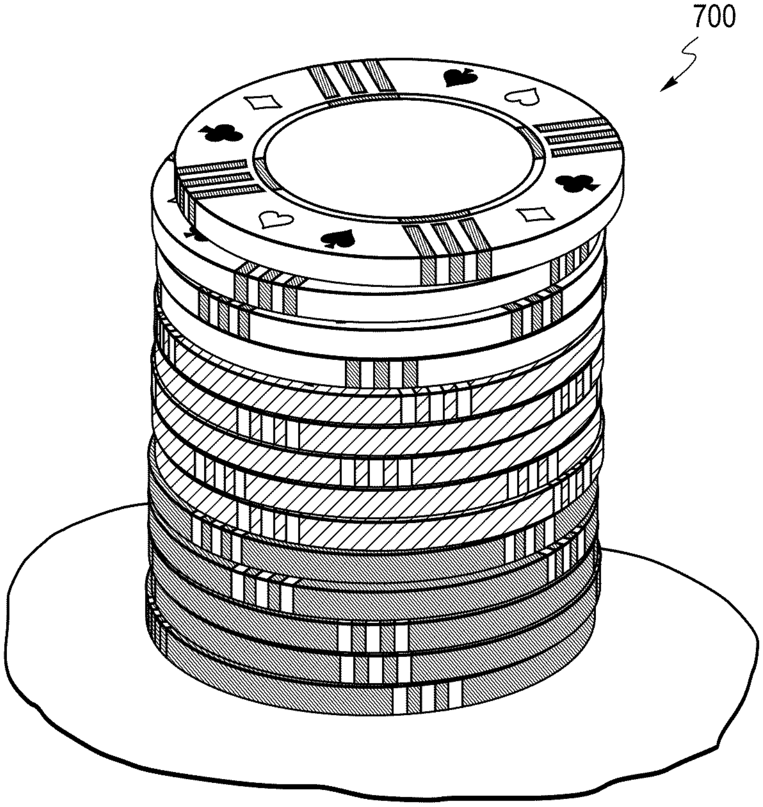
FIG. 7 is an illustration of a chip stack of an embodiment.

For chip recognition, the processor can capture the side view of a stack of chips, as shown in FIG. 7, and identify the chips in the stack using, for example, a Circle Hough Transform. Once a chip pile (with one or more chips) is identified, the processor 200 can detect the edges of the chips to separate out individual chips. Next, the processor 200 can use the color and stripe pattern of each chip to identify the chip value. The processor 200 can first perform an initial learning step on all casino chips. Here, the quality of the image on chip pile can be very important to the overall accuracy of the chip count and chip value recognition. To this end, the processor 200 can cause the cameras of the device 100 to zoom-in on the chip pile to capture high-quality pictures.

Every time the computer vision module is called, the processor 200 can have the information about each player's bet(s); each player's card(s), if any; the dealer's card(s), if any; and the community card(s), if any. Before the game monitoring device 100 is used in live casino games, supervised learning on both casino cards and all varieties of chips can be performed during the initial system setup.

To improve the accuracy of image recognition, high-quality images can be used. The processor 200 can first detect the area of interest, then use the context of the table game 20 to determine which object within an image should stay in focus and adjust the camera angle and zoom settings towards the specific area automatically. Then, the processor 200 can examine the target object to decide if it is sufficiently sharp. In a short amount of time, the processor's AI-powered autofocus system can learn and adjust the camera to bring the target object sufficiently into focus.

To overcome the challenge that partially blocked chips may affect the accuracy of chip value detection, the processor 200 can use a continuous representation of images to monitor the entire chip betting process, from the initial chip gathering all the way to the final placement of chips at each betting area. This process can accurately detect main bets, side bets, and tips, regardless of whether the chips are blocked. The processor 200 can also cache previous bets for intelligent analysis in case there is no chip change in the same betting area. The continuous representation can require the processor 200 to store some informative images, which can occupy quite a lot of memory space. The processor 200 can use an intelligent storage space releasing algorithm to ensure the system efficiently deletes images no longer in use.

In addition to performing the functions of the computer vision software module, the processor 200 can implement a game judgment algorithm to detect the start of a game, record the wage on each betting spot for each player and check whether the bets satisfy betting rules (such as each bet is within a minimum and maximum wage, certain bets are equal in value for each play if designed to be equal, etc.), detect the end of a game, determine win/loss/push of each bet for each active player in the game, look-up payout odds and calculate theoretical payout for each winning bet of each player, and determine if dealer actions are consistent with the algorithm outputs for each bet active on the game table. The dealer actions can include, but are not limited to, taking a player's bet away if a player loses, no action when a player pushes, paying the player on each winning bet where the payout value is detected by computer vision software module, and outputting a warning signal if an action is inconsistent with its theoretical output.

A separate game judgment algorithm can be designed for each specific casino game. For example, for different games, different number of cards are dealt, the sequence of dealing cards can be different, the timing of determining win/lose can be different, the location of community cards, if any, can be different, and/or the dealer may not even have cards (such as in Mississippi Stud or Cajun Stud). Also, for the same game, the payout odds can be different among different casinos. As a result, the game judgment algorithm can be implemented specific for a specific game in a specific casino.

First, to check if it is the start of a new game, a picture of the game table is generated constantly by the camera(s). The computer vision module analyzes the image to see if there are no card(s) on table (by looking for either the back or front of the card(s)) and if there is at least one bet in the designated betting area. If a game starts, the processor 200 records the bet(s) and checks if any bet violates the game rules (e.g., min/max bet or equal wage value between two bets for the player). If there is a violation, the notification system 130 will notify the dealer if there is a bet violation and the dealer should let the player correct the violation.

Next, the processor 200 checks if any card is dealt out, which indicates that the initial bets are all set. If no cards have been dealt, the processor 200 performs the above-described acts again to see if the player(s) might still set up new bet(s). If the cards have been dealt, the processor 200 checks if all active player(s) with bet(s) received card(s). If not, the processor 200 waits and checks again until all active players have received card(s). The processor 2002 then updates bet(s) for all active player(s) and records the community cards exposure status (i.e., the number of cards exposed along with their values/suits and the number of cards not exposed yet). If there is no community card, the processor 200 skips all the steps related to the community cards. If there is a community card, the processor 200 checks if all community cards have been exposed. If not, the processor waits for all community cards to be exposed and then checks for the dealer's cards. The processor 200 waits until dealer's cards are exposed or determines that there are no dealer's cards in the game. The processor 200 then performs a final update on bets and checks for bet violations. Finally, the processor 200 determines win/loss/push for each bet on the table and calculates payout for each win. This is called a theoretical outcome. For each player, the processor 200 checks if the dealer's action is consistent with the theoretical outcome. If there is any inconsistency, the notification system 130 is activated to notify the dealer/supervisor about the incorrect payout. Otherwise, this round of the game is finished, and the processor 200 repeats the above steps for the next round of the game.

FIGS. 8-14 present various flowcharts that provide example implementations of the various functions described above. It should be understood that these flowcharts are merely examples and that other implementations can be used.

Figure 8:
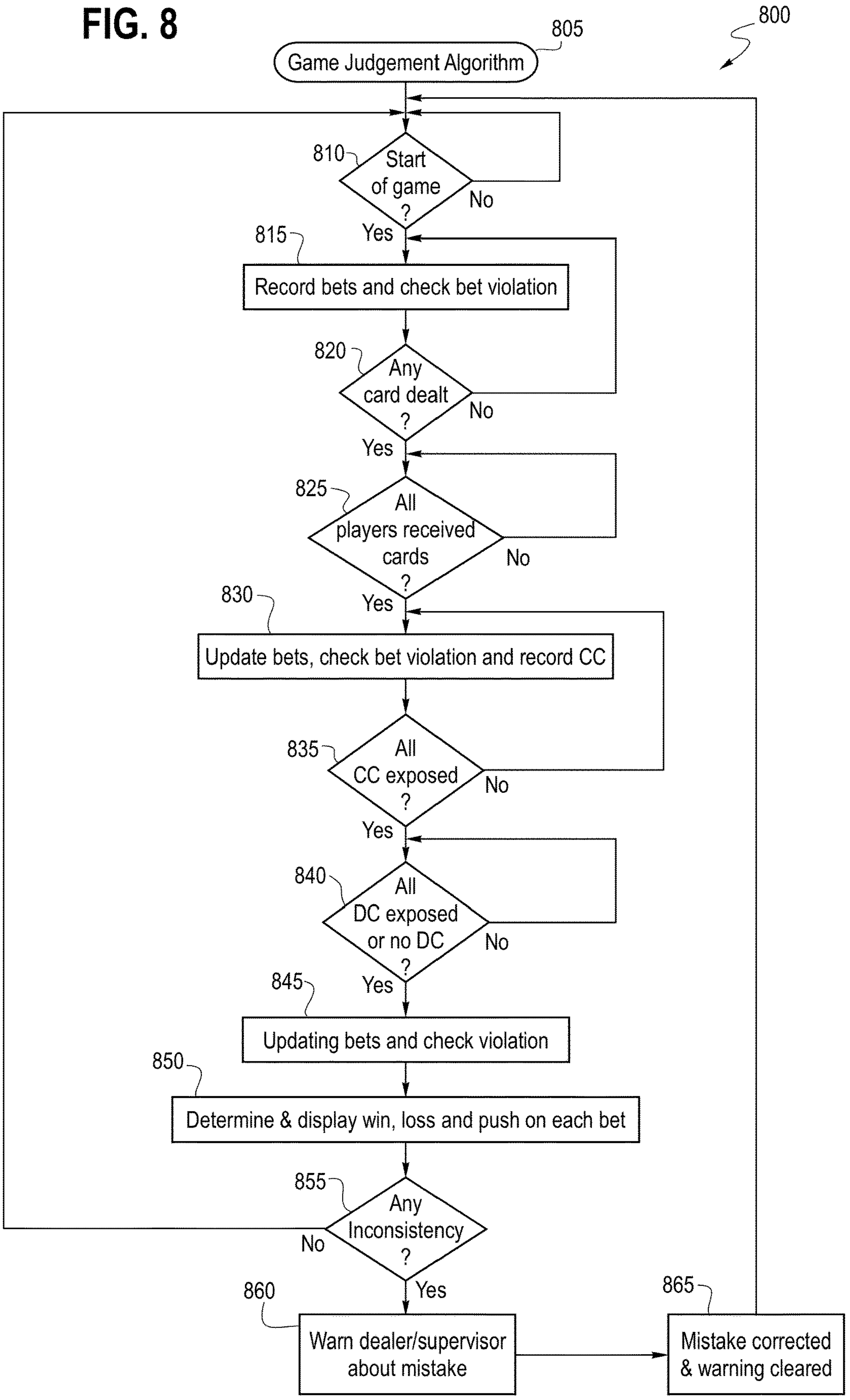
FIG. 8 is a flow chart of a game judgement algorithm of an embodiment.

FIG. 8 is a flow chart 800 of a game judgement algorithm 805 of an embodiment. As shown in FIG. 8, the processor 200 determines if it is the start of a game (act 810). If it is, the processor 200 records the bets and checks for a bet violation (act 815). The processor 200 then determines of any card has been dealt (act 820), and, if a card has been dealt, the processor 200 determines if all players received cards (act 825). If all players have received cards, the processor 200 updates bets, checks for bet violations, and records the community cards (act 830). Next, the processor 200 determines if all the community cards have been exposed (act 835). If all the community cards have been exposed, the processor 200 determines if all or none of the dealer cards have been exposed (act 840). If all or none of the dealer cards have been exposed, the processor 200 updates the bets and checks for a violation (act 845). The processor 200 then determines and displays the win, loss, and push information for each bet on the display area 130 of the game monitoring device 100. The processor 200 then checks for any inconsistencies (act 855). If an inconsistency is found, the processor 200 will warn the dealer/supervisor about the mistake via the display area 120 (act 860). After the mistake has been corrected, the dealer/supervisor presses the "clear" button displayed on the screen 130 and, in response, the processor 200 clears the warning (act 865).

Figure 9:
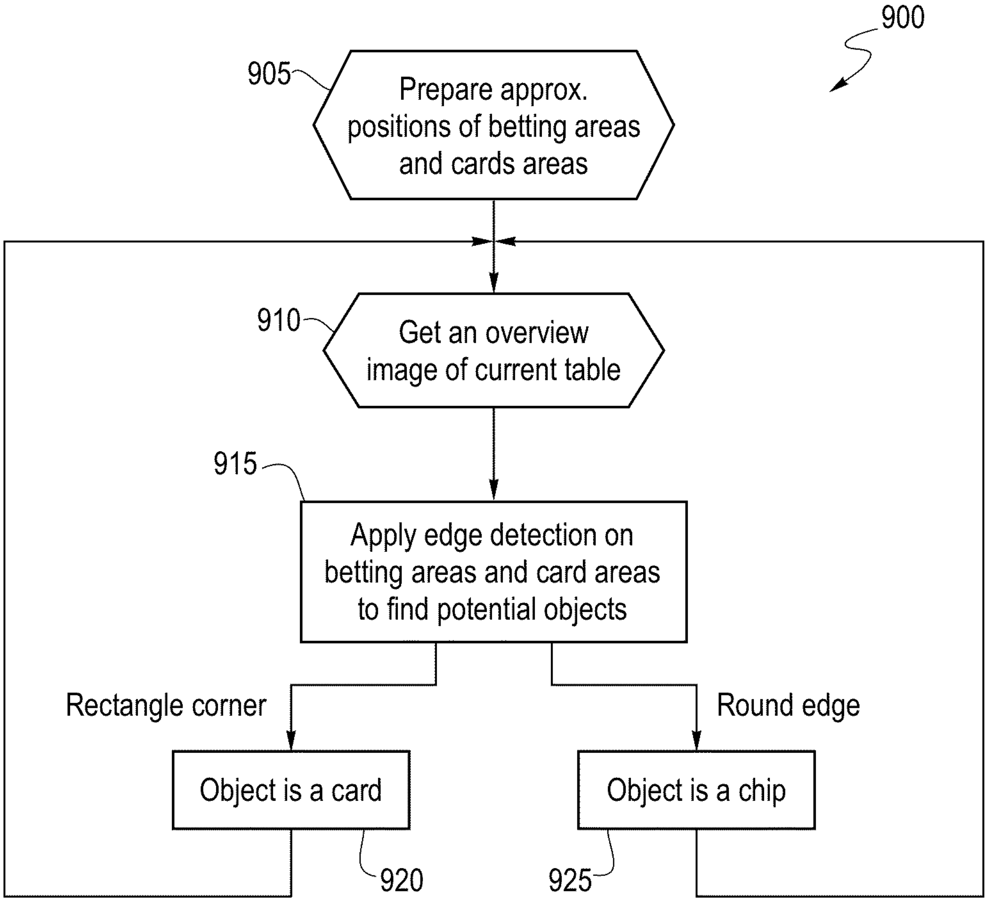
FIG. 9 is a flow chart of a method of an embodiment for detecting a card or a chip.

FIG. 9 is a flow chart 900 of a method of an embodiment for detecting a card or a chip. As shown in FIG. 9, the processor 200 prepares approximate positions of the betting areas and the card areas (act 905). Next, the processor 200 then gets an overview image of the current table from one or more of the cameras 110, 120 (act 910). The processor 200 then applies edge detection on the betting areas and card areas to find potential objects (act 915). If the processor 200 finds a rectangular corner, the processor 200 concludes that the image is of a card (act 925). However, if the processor 200 finds a round edge, the processor 200 concludes that the image is of a chip (act 925).

Figure 10:
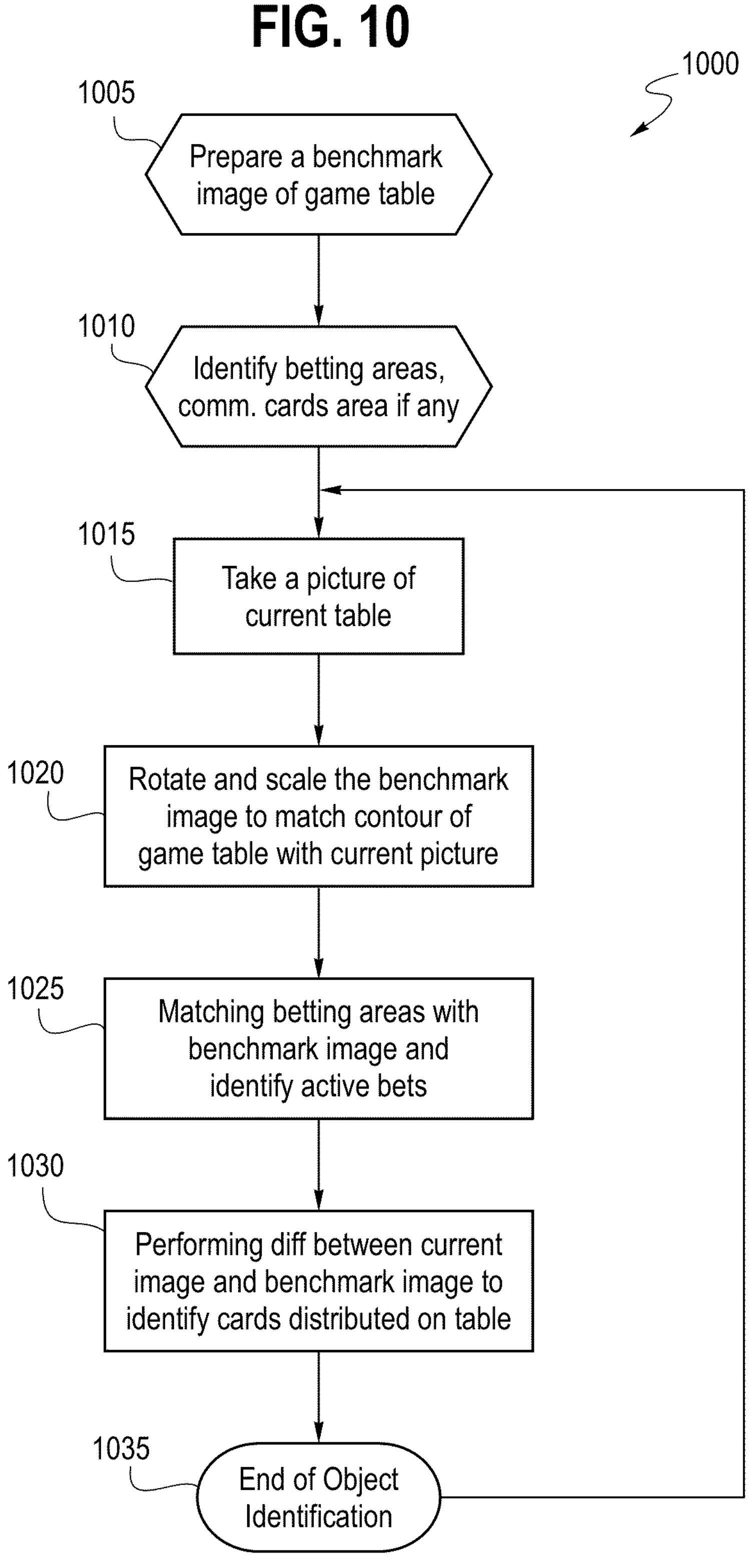
FIG. 10 is a flow chart of a method of an embodiment for object identification.

FIG. 10 is a flow chart 1000 of a method of an embodiment for object identification. As shown in FIG. 10, the processor 200 prepares a benchmark image of the game table (act 1005). Next, the processor 200 identifies the betting area and community cards, if any (act 1010). The processor 200 receives, from the camera(s), a picture of the current table (act 1015) and rotates and scales the benchmark image to match the contour of the game table with the current picture (act 1020). Then, the processor 200 matches the betting areas with the benchmark images and identifies active bets (act 1025). Finally, the processor 200 performs differentiation between the current image and the benchmark image to identify cards distributed on the table (act 1030), which is the end of the object identification process (act 1035).

Figure 11:
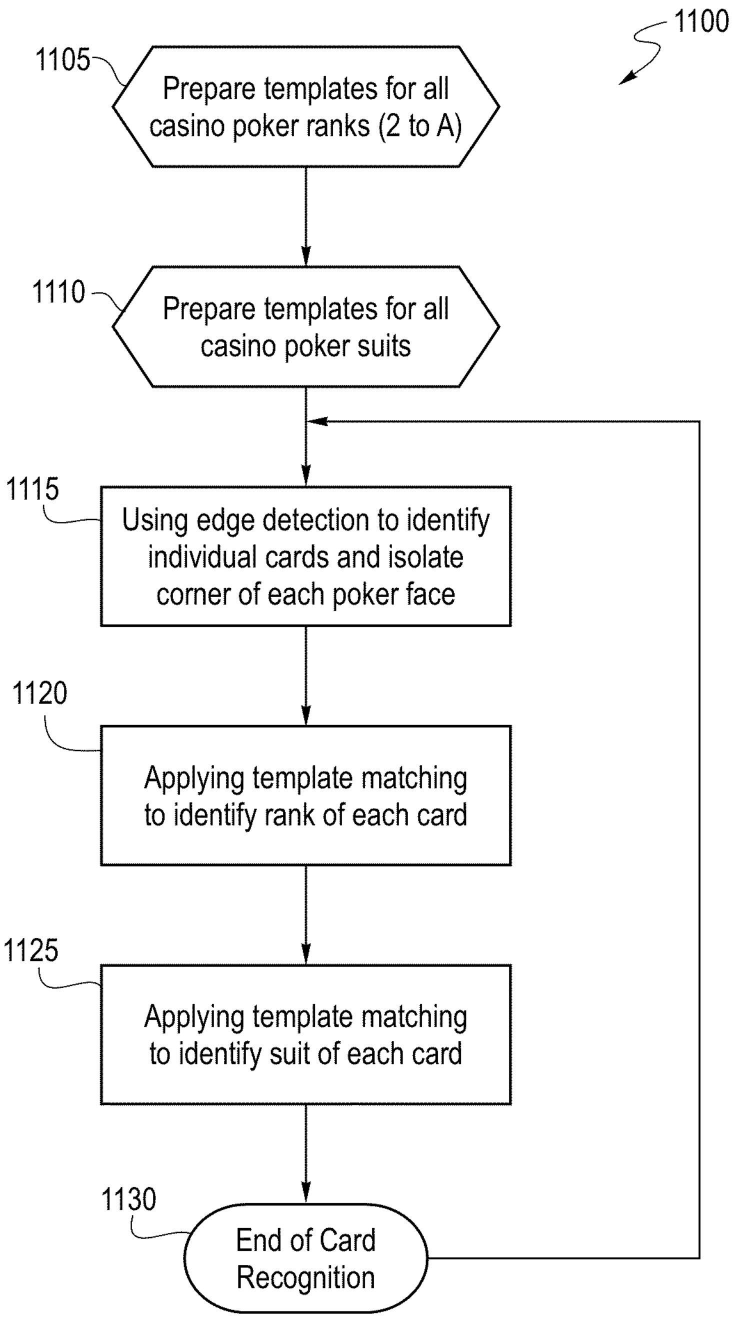
FIG. 11 is a flow chart of a method of an embodiment for card recognition.

FIG. 11 is a flow chart 1100 of a method of an embodiment for card recognition. As shown in FIG. 11, the processor 200 prepares templates for all casino poker ranks (e.g., 2 to Ace) (act 1105). Then, the processor 200 prepares templates for all casino poker suits (act 1110). The processor 200 then uses edge detection to identify individual cards and isolate the corner of each poker face (act 1115). Next, the processor 200 applies template matching to identify the rank of each card (act 1120) and then applies template matching to identify the suit of each card (act 1125), which is the end of the card recognition process (act 1130).

Figure 12:
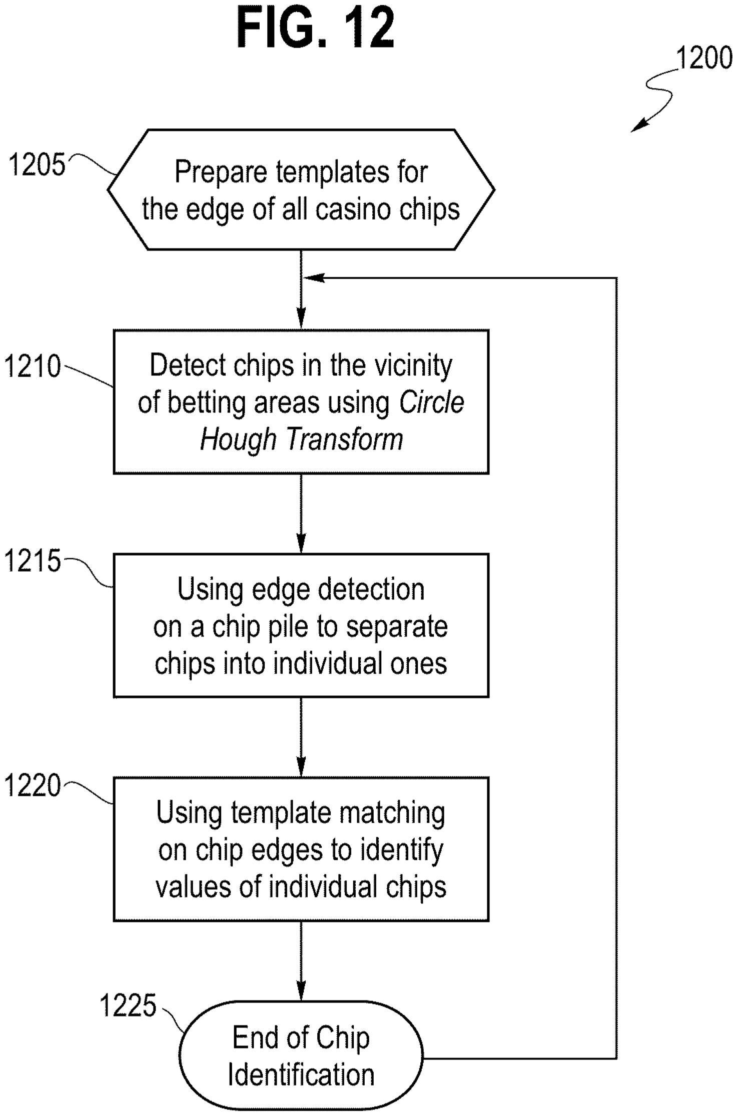
FIG. 12 is a flow chart of a method of an embodiment for card identification.

FIG. 12 is a flow chart 1200 of a method of an embodiment for card identification. As shown in FIG. 12, the processor 200 prepares templates for all casino chips (act 1205). Then, the processor 200 detects chips in the vicinity of the betting area (e.g., using a Circle Hough Transform) (act 1210). Next, the processor 200 uses edge detection on a chip pile to separate chips into individual chips (act 1215). The processor 200 then uses template matching on the chip edges to identify values of individual chips (act 1220), which is the end of the chip identification process (act 1225).

Figure 13:
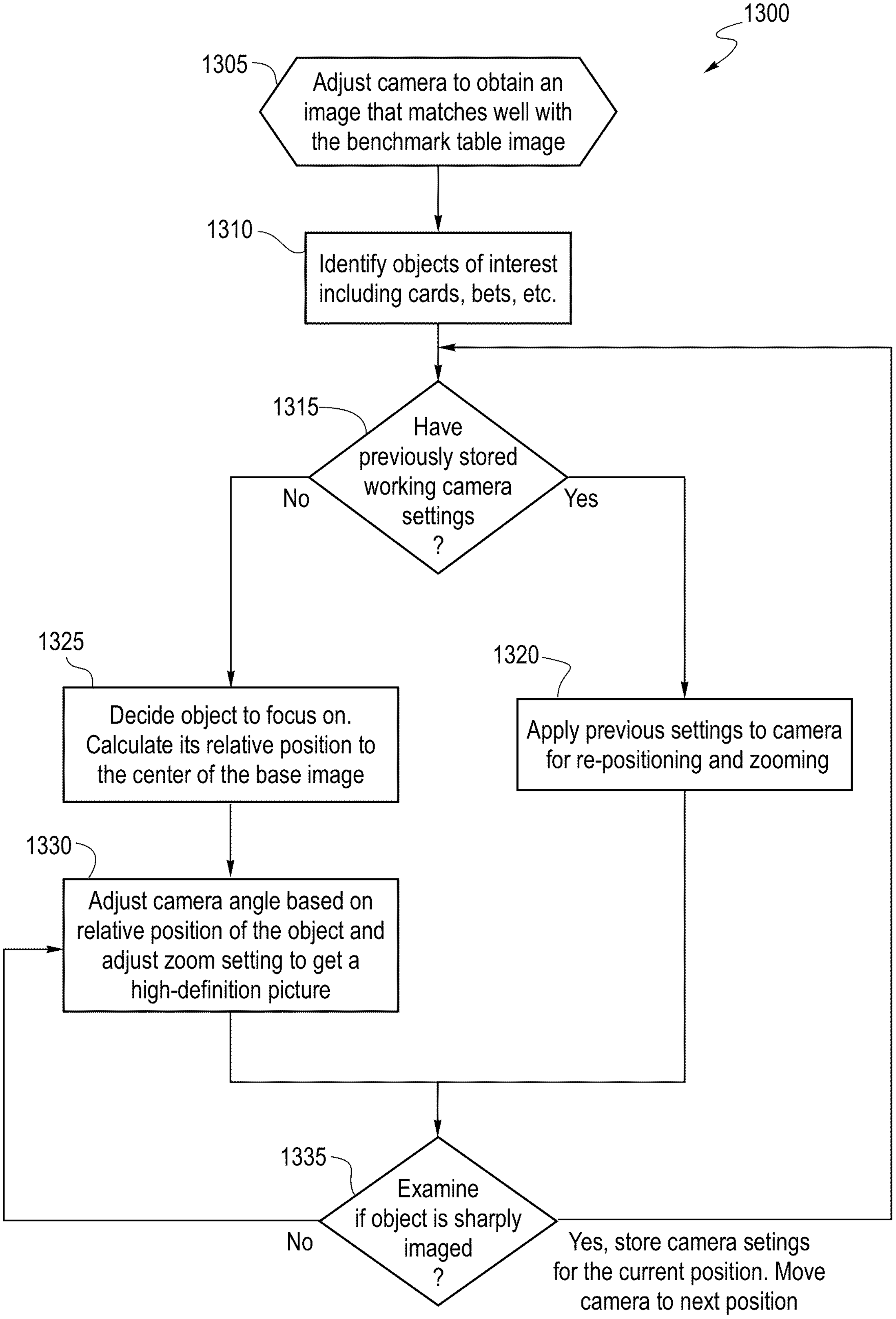
FIG. 13 is a flow chart of a method of an embodiment for camera focusing.

FIG. 13 is a flow chart 1300 of a method of an embodiment for camera focusing. As shown in FIG. 13, the processor 200 adjusts the camera to obtain an image that matches well with the benchmark table image (act 1305) and identifies objects of interest (e.g., cards, bets, etc.) (act 1310). The processor 200 then determines if it has previously stored working camera settings (act 1315). If working camera settings have been previously stored, the processor 200 applies the previous settings to the camera for re-positioning and zooming (act 1320). If working camera settings have not been previously stored, the processor 200 decides which object on the table to focus on and calculates its relative position to the center of the base image (act 1325). The processor 200 then adjusts the camera angle based on the relative position of the object and adjusts zoom settings to get a high-definition picture (act 1330). The processor 300 then determines if the object is sharply imaged (act 1335). If the object is not sharply imaged, the processor 200 repeats act 1330. If the object is sharply imaged, the processor 200 stores the camera settings for the current position and moves the camera to the next position.

Figure 14:
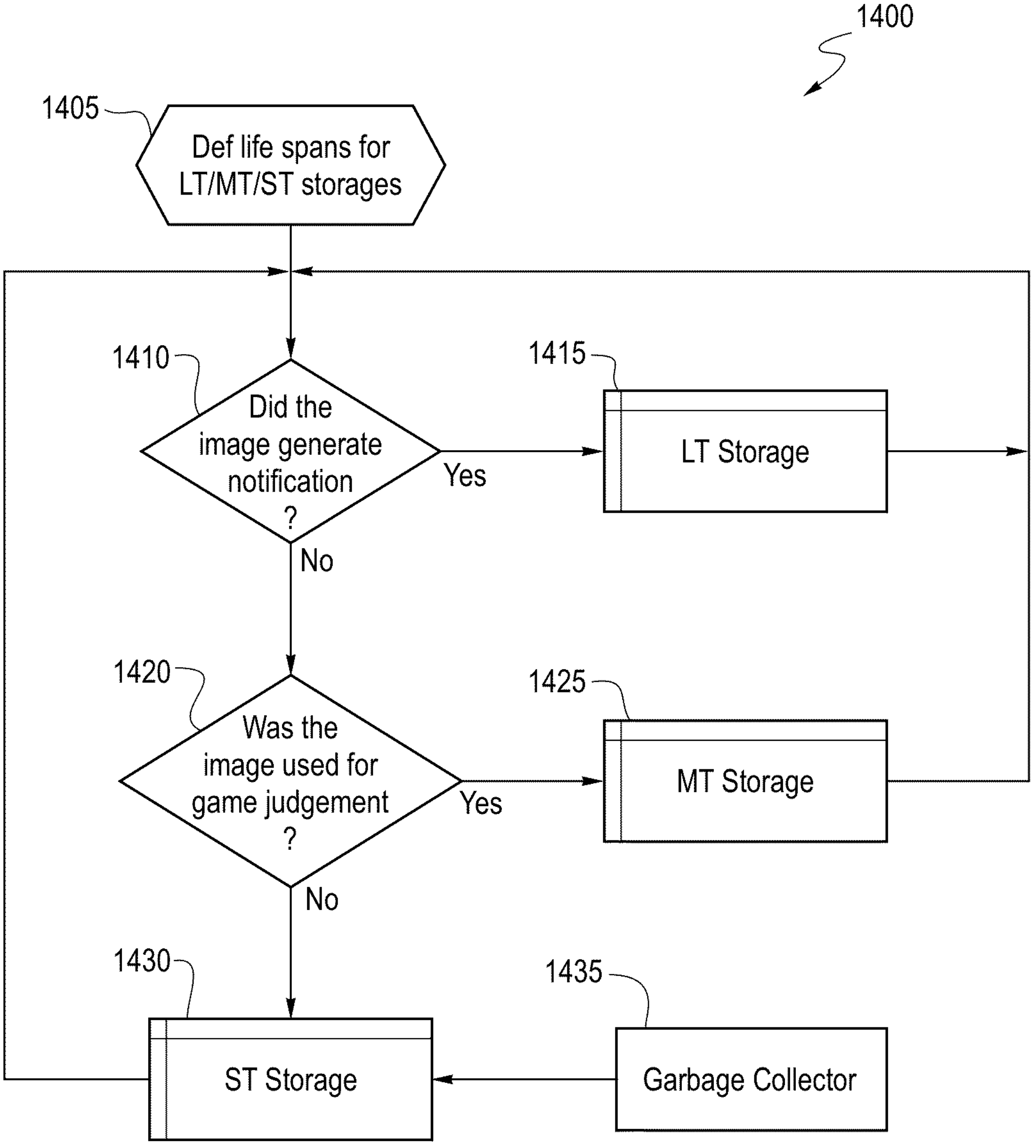
FIG. 14 is a flow chart of a method of an embodiment for image storage.

FIG. 14 is a flow chart 1400 of a method of an embodiment for defining the life spans of long-term, medium-term, and short-term storage (act 1405). As shown in FIG. 14, if the processor 200 determines that the image generated a notification (act 1410), the processor 200 stores the image in long-term storage 1420. If the processor 200 determines that the image was used for game judgement (act 1420), the processor 200 stores the image in medium-term storage 1425. If neither of those conditions apply, the processor 200 stores the image in short-term storage 1430, which is subject to garbage collection by a garbage collector 1435.

There are many alternatives that can be used with these embodiments. Some examples of these alternatives are listed below. It should be understood that these are merely examples and should not be read into the claims unless expressly recited therein. For example, the non-invasive standalone device can be powered by edge computing and computer vision. The device can comprise one or multiple artificial-intelligence (AI)-powered autofocus camera(s), embedded processor(s) (e.g., a central processing unit (CPU), graphics processing unit (GPU), tensor processing unit (TPU), etc.), memory chip(s), and other hardware to support the standalone operating system. The device can use a continuous image capture process that captures real-time images of the entire gaming table or portion of the gaming table at a certain frequency without capturing players' faces to avoid privacy issues. The device can have software that uses computer vision technologies in combination with a camera and artificial intelligence to achieve image recognition to identify objects on the game table including, but not limited to, card value, dice face value, and chip face value even when chips are in a stacked pile. A pre-trained, built-in machine learning module can be used to re-train models offline with real-time images and objects, and software with a configurable game rules engine can be used to determine if a specific bet violates rules predefined by the casino and to determine the win/loss of competing hands for any table game and to calculate payouts to all winning bets. A display/notification area on the device can display betting violations and/or win/loss results along with payout on each bet in real-time before the dealer collects or deals out chips for each player. The notification system can also detect dealer mistakes in real-time and alert the dealer/manager with predicted results. A physical interface on the device can be provided to allow the dealer to verify/reject/consult notifications. A built-in software module can be used to store historical data for table performance and/or dealer performance analysis for in-depth analytics. Historical data can be accessed live or batch exported from a local-area-network (LAN) computer to a cloud server. A built-in data analytics module in the device can determine profitability of each side bet within each game, so that a casino can make decision on which side bets are to be included in a particular game. Multiple devices can be configured in batch via a mobile app or a software application running on a processor of a separate computing device, and some device settings can also be adjusted at the device (e.g., by a supervisor).

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A method, comprising:

performing the following in a computing device:

receiving images of game objects and chips used in a game;

performing a training process to associate the images of the game objects and chips with values;

generating a training result file from the training process, wherein the training result file further comprises game rules; and communicating the training result file to a plurality of game monitoring devices, wherein a first game monitoring device of the plurality of game monitoring devices is a self-contained, stand-alone device that determines and displays a notification regarding an outcome of the game, based on the training result file, without communicating with a remote device during game play, and the first game monitoring device comprises a memory configured to store first images according to an intelligent storage algorithm where retention of any given image in the first images is based on a use of that image.

2. The method of claim 1, wherein the training result file is communicated to the plurality of game monitoring devices in a batch broadcast.

3. The method of claim 1, wherein the training result file is communicated to the plurality of game monitoring devices on a serial basis.

4. The method of claim 1, further comprising customizing the game rules.

5. The method of claim 1, wherein the first game monitoring device comprises:

a housing;

a display device;

the memory configured to store the game rules;

at least one camera configured to capture images of a gaming table on which the game is played; and at least one processor configured to:

analyze images, captured by the at least one camera, of game objects and chips on the gaming table to determine the outcome of the game; and display, on the display device as an assistance to a human dealer at the gaming table, the notification regarding the outcome of the game.

6. A non-transitory computer-readable medium storing computer-readable program code that, when executed by at least one processor, causes the at least one processor to perform functions comprising:

receiving images of game objects and chips used in a game;

performing a training process to associate the images of the game objects and chips with values;

generating a training result file from the training process, wherein the training result file further comprises game rules; and communicating the training result file to a plurality of game monitoring devices, wherein a first game monitoring device of the plurality of game monitoring devices is a self-contained, stand-alone device that determines and displays a notification regarding an outcome of the game, based on the training result file, without communicating with a remote device during game play, and the first game monitoring device comprises a memory configured to store first images according to an intelligent storage algorithm where retention of any given image in the first images is based on a use of that image.

7. The non-transitory computer-readable medium of claim 6, wherein the training result file is communicated to the plurality of game monitoring devices in a batch broadcast.

8. The non-transitory computer-readable medium of claim 6, wherein the training result file is communicated to the plurality of game monitoring devices on a serial basis.

9. The non-transitory computer-readable medium of claim 6, wherein the computer-readable program code, when executed by the at least one processor, further causes the at least one processor to customize the game rules.

10. The non-transitory computer-readable medium of claim 6, wherein the first game monitoring device comprises:

a housing;

a display device;

the memory configured to store the game rules;

at least one camera configured to capture images of a gaming table on which the game is played; and at least one processor configured to:

analyze images, captured by the at least one camera, of game objects and chips on the gaming table to determine the outcome of the game; and display, on the display device as an assistance to a human dealer at the gaming table, the notification regarding the outcome of the game.

11. A game monitoring device comprising:

at least one camera configured to capture images of a gaming table on which the game is played; and at least one processor; and a housing;

wherein the at least one processor is configured to:

receive a training result file comprising game rules;

analyze images, captured by the at least one camera, of game objects and chips on the gaming table to determine an outcome of the game based on the game rules; and display, on the display device as an assistance to a human dealer at the gaming table, a notification regarding the outcome of the game; and the game monitoring device further comprises a memory configured to store the images according to an intelligent storage algorithm where retention of any given image in the images is based on a use of that image, wherein the game monitoring device is a self-contained, stand-alone device in that the display device, the memory, the at least one camera, and the at least one processor are all carried by the housing and in that the analyzing and displaying both occur in the game monitoring device without a need to communicate with a remote device during game play.

12. The game monitoring device of claim 11, wherein the training result file is generated from a training process that associates images of game objects and chips with values.

13. The game monitoring device of claim 11, wherein the at least one processor is further configured to:

use artificial intelligence to analyze the images captured by the at least one camera of the gaming table to determine an area of interest on the gaming table; and automatically focus the at least one camera on the area of interest.

14. The game monitoring device of claim 11, wherein the at least one camera is further configured to capture a plurality of images of the gaming table throughout the game.

15. The game monitoring device of claim 11, wherein the notification regarding the outcome of the game comprises an identification of a winner of the game and/or a payout of bets.

16. The game monitoring device of claim 11, wherein the notification regarding the outcome of the game comprises a notification of a dealer error.

17. The game monitoring device of claim 11, wherein the at least one processor is further configured to display, on the display device, a notification of a player's violation of a betting rule.

18. The game monitoring device of claim 11, wherein the at least one processor is further configured to display, on the display device, a notification of a dealer chip count.

19. The game monitoring device of claim 11, wherein the at least one processor is further configured to store, in the memory, a history of games monitored by the game monitoring device for later analysis.

20. The game monitoring device of claim 11, wherein the at least one processor is further configured to communicate, outside of game play, with a first remote device to receive a software update.

* * * * *